(12) United States Patent
Naderer et al.

(10) Patent No.: US 10,927,989 B2
(45) Date of Patent: Feb. 23, 2021

(54) CONNECTING PIECE

(71) Applicant: DYNAMIC E FLOW GMBH, Kaufbeuren (DE)

(72) Inventors: Michael Naderer, Salfzburg (DE); Nikolaus Schweinert, Kaufbeuren (DE)

(73) Assignee: DYNAMIC E FLOW GMBH, Kaufbeuren (DE)

( * ) Notice: Subject to any disclaimer, the term of this patent is extended or adjusted under 35 U.S.C. 154(b) by 299 days.

(21) Appl. No.: 15/765,401

(22) PCT Filed: Sep. 26, 2016

(86) PCT No.: PCT/EP2016/072807
§ 371 (c)(1),
(2) Date: Apr. 2, 2018

(87) PCT Pub. No.: WO2017/055202
PCT Pub. Date: Apr. 6, 2017

(65) Prior Publication Data
US 2018/0306357 A1    Oct. 25, 2018

(30) Foreign Application Priority Data
Oct. 2, 2015    (DE) .................... 10 2015 116 811.1

(51) Int. Cl.
*F16L 25/02*    (2006.01)
*F16L 39/00*    (2006.01)
(Continued)

(52) U.S. Cl.
CPC ............... *F16L 25/02* (2013.01); *F16L 39/00* (2013.01); *F16L 41/03* (2013.01); *H02K 3/22* (2013.01); *H02K 9/19* (2013.01)

(58) Field of Classification Search
CPC . F16L 25/02; F16L 41/03; H02K 3/22; H02K 9/19
See application file for complete search history.

(56) References Cited

U.S. PATENT DOCUMENTS 3,563,265 A * 2/1971 Graham ................ F16K 5/0626
137/269
3,614,493 A   10/1971 Collings et al.
(Continued)

FOREIGN PATENT DOCUMENTS

CN    202487871 U    10/2012
DE    1538928 A1    12/1970
(Continued)

OTHER PUBLICATIONS

Chinese Office Action for application No. 201680057375.9 dated May 28, 2019 with English Translation.
(Continued)

*Primary Examiner* — David Bochna
(74) *Attorney, Agent, or Firm* — Carter, DeLuca & Farrell LLP

(57) ABSTRACT

A connecting piece for connecting a hollow electric conductor and a coolant line includes a fluid-tight housing (1) having a hollow inner space; a hollow conductor opening (2) in the housing (1); a coolant line opening (3) in the housing (1); and an electrically insulating separating element (4). The inner space hydraulically connects the hollow conductor opening (2) and the coolant line opening (3). The housing (1) includes a coolant line-side housing part (5) and a hollow conductor-side housing part (6). The separating element (4) is arranged between the coolant line-side housing part (5) and the hollow conductor-side housing part (6), and has a coolant channel (7). The separating element (4) is formed as a ball.

12 Claims, 2 Drawing Sheets

Figure 1:
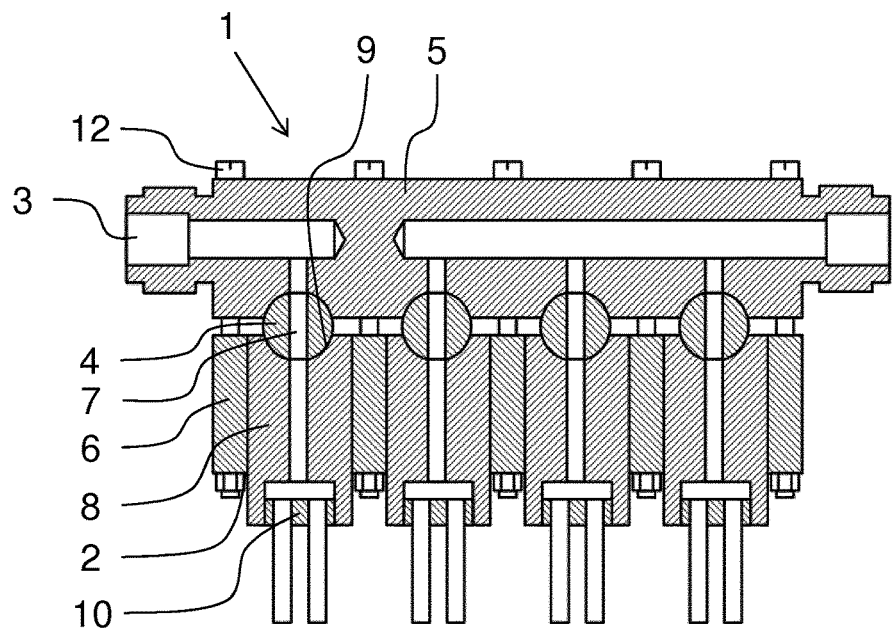

(51) Int. Cl.
*F16L 41/03* (2006.01)
*H02K 3/22* (2006.01)
*H02K 9/19* (2006.01)

(56) References Cited

U.S. PATENT DOCUMENTS

| | | | | |
|---|---|---|---|---|
| 4,568,890 | A * | 2/1986 | Bates | H03B 9/146 |
| | | | | 331/107 C |
| 4,815,704 | A * | 3/1989 | Berchem | F16K 5/0657 |
| | | | | 251/315.04 |
| 4,894,575 | A | 1/1990 | Nilsson et al. | |
| 5,127,628 | A * | 7/1992 | Kemp | F16K 5/0647 |
| | | | | 251/304 |
| 7,216,672 | B1 * | 5/2007 | Chen | F16K 11/20 |
| | | | | 137/883 |
| 2004/0177623 | A1 | 9/2004 | Zelissen et al. | |
| 2005/0247762 | A1 | 11/2005 | Breznak et al. | |
| 2008/0000533 | A1 | 1/2008 | Katsura | |
| 2009/0239408 | A1 | 9/2009 | Sacher et al. | |
| 2010/0096362 | A1 * | 4/2010 | Hirayama | H01J 37/32192 |
| | | | | 216/69 |
| 2011/0025145 | A1 | 2/2011 | Auernhammer | |
| 2013/0020939 | A1 * | 1/2013 | Kim | H01P 3/123 |
| | | | | 315/111.41 |
| 2017/0077581 | A1 * | 3/2017 | Nickel | H01P 1/02 |
| 2018/0337568 | A1 * | 11/2018 | Dorfner | H02K 1/20 |

FOREIGN PATENT DOCUMENTS

| | | | |
|---|---|---|---|
| DE | 19617540 A1 | 11/1997 | |
| EP | 29732 A1 * | 6/1981 | ........... F16K 6/0657 |
| EP | 1803983 A1 | 7/2007 | |
| JP | 04351382 A * | 12/1992 | ............... F16K 5/06 |
| JP | 2002168545 A | 6/2002 | |
| KR | 20110008334 U * | 8/2011 | ........... F16L 3/1083 |
| WO | 2012024471 A2 | 2/2012 | |
| WO | 2013158392 A2 | 10/2013 | |
| WO | 2015057400 A1 | 4/2015 | |
| WO | 2015150556 A1 | 10/2015 | |

OTHER PUBLICATIONS

Korean Notification of Reason for Refusal for application No. 10-2018-7009636 dated Jun. 3, 2019 with English translation.
International Search Report for appln. No. PCT/EP/2016/072807 dated Mar. 23, 2017 (11 pages).
German Office Action for application No. 10 2015 116 811.1, dated May 24, 2016, 5 pages.

* cited by examiner

CONNECTING PIECE

CROSS REFERENCE TO RELATED APPLICATIONS

This application is a National Stage of, and claims priority to and the benefit of, International Patent Application No. PCT/EP2016/072807 filed on Sep. 26, 2016, the entire content of which is incorporated by reference herein.

FIELD

This disclosure is generally related to a connecting piece and, more particularly, to a connecting piece connecting an electric hollow conductor and a coolant line.

BACKGROUND

Connecting devices for coolant lines may include a coolant channel and a connector.

SUMMARY

A connecting piece connecting an electric hollow conductor and a coolant line according to the disclosure includes a fluid-tight housing having a hollow inner space; a hollow conductor opening in the housing; a coolant line opening in the housing and an electrically insulating separating element. The inner space hydraulically connects the hollow conductor opening and the coolant line opening. The housing includes a coolant line-side housing part and a hollow conductor-side housing part. The separating element is arranged between the coolant line-side housing part and the hollow conductor-side housing part, and has a coolant channel. The separating element (4) is formed as a ball.

The present invention relates to a connecting piece for connecting a hollow electric conductor and a coolant line, comprising: a fluid-tight housing having a hollow inner space; a hollow conductor opening in the housing for receiving the hollow electric conductor; a coolant line opening in the housing for receiving the coolant line; and an electrically insulating separating element, wherein: the inner space is formed hydraulically connecting the hollow conductor opening and the coolant line opening, the housing comprises a coolant line-side housing part and a hollow conductor-side housing part that can be separated from the coolant line-side housing part; and the separating element is arranged between the coolant line-side housing part and the hollow conductor-side housing part, is formed spacing the coolant line-side housing part and the hollow conductor-side housing part apart from each other and has a coolant channel, wherein the coolant channel is providing at least one part of the inner space.

A hollow electric conductor in the sense of the present invention is a hollow conductor that can be used for hydraulically guiding the coolant and for electrically guiding electric currents. In particular, the hollow electric conductor is formed as a round tube and has an outer diameter ranging from 1.0 mm to 3.2 mm.

The coolant flowing in the hollow electric conductor and the coolant line consists of an electrically insulating fluid, wherein the fluid is a liquid or a gas. If the fluid is a gas, then all references to hydraulics are to be replaced with pneumatics. For example, the inner space is then formed pneumatically connecting the hollow conductor opening and the coolant line opening.

A generic connecting piece is known from the applicant's international patent application PCT/EP2015/057 400 that is post-published prior art to the present application. So that the generic connecting piece is permanently tight at very high pressures, for example more than 100 bar, and/or temperatures, for example more than 100° C., it requires as precise a composition of the generic connecting piece as possible, which increases the production costs and the chance of mistakes.

It is thus the object of the present invention to specify a connecting piece of the type mentioned above that can be produced simply and in a way that is tolerant of faults.

To solve this object, the present invention proposes a connecting piece of the type mentioned above, wherein the separating element is formed as a ball. To great advantage, the ball provides for an automatic centering of the coolant line-side housing part relative to the hollow conductor-side housing part with the assembly of the connecting piece according to the invention. At the latest shortly before a mounting final position, the geometry of the ball causes an exact alignment of the coolant line-side housing part relative to the hollow conductor-side housing part. A displacement between the coolant line-side housing part and the hollow conductor-side housing part that could lead to a loss of tightness of the connecting piece according to the invention is constructively precluded. Thus, the connecting piece according to the invention can be produced simply and in a manner that is tolerant of faults, without losing any functionality. Furthermore, the ball is optimally pressure-resistant because of its geometry. A favourable pressure distribution that is required, in particular, with high pressures in the inner space, helps to avoid pressure or tension peaks that wear out material, which clearly improves the durability of the connecting piece according to the invention. The coolant channel of the ball is a through opening, in particular a through bore.

In a particularly advantageous embodiment of the present invention, the separating element consists of a ceramic material. Ceramic materials are sufficiently pressure resistant, heat resistant and electrically insulating. A preferred ceramic material is zirconium dioxide. In an alternative embodiment of the present invention, the separating element consists of polytetrafluoroethylene (PTFE, Teflon®) which is sufficiently stable at lower pressures and lower temperatures.

In a very advantageous embodiment of the present invention, the connecting piece comprises an electrically conductive coupling piece arranged in the hollow conductor opening for fixing the hollow electric conductor to the hollow conductor-side housing part, wherein the coupling piece has a spherical segment-shaped or spherical recess on a ball-side end of the coupling piece. The coupling piece serves as an adapter between the generally filigree, hollow electric conductor and the hollow conductor-side housing part. The spherical segment-shaped recess partially surrounds the ball and thus provides a stable connection to the ball. The spherical segment-shaped or spherical recess and the ball are adjusted to each other in terms of their sizes, wherein a diameter of the ball ranges from 4 mm to 30 mm. It is preferred that the diameter is equal to 8 mm, 10 mm, 12 mm or 15 mm.

In a further embodiment of the present invention, the coupling piece comprises a collecting disc on a hollow conductor-side end of the connecting piece, wherein the collecting disc has two or more bores for receiving hollow electric conductors. The collecting disc serves for the hydraulic and electric combining of two or more hollow electric conductors into a coupling piece. It is preferred that the collecting disc has three, six, nine or more bores. In an alternative embodiment, the collecting disc only has one bore for receiving an hollow electric conductor. In this case, the collecting disc is a sleeve.

In a subsequent embodiment of the present invention, the coupling piece comprises a contact plate, wherein the contact plate is formed passing through the hollow conductor-side housing part. The contact plate provides an electric coupling for the hollow electric conductor of the coupling piece that is accessible from outside the housing.

In an extremely advantageous embodiment of the present invention, the housing has two or more inner spaces, wherein a first inner space of the inner spaces and a second inner space of the inner spaces that is different from the first inner space are hydraulically separated from each other inside the housing. As a result of the two or more inner spaces in the housing part, to great advantage, the connecting piece provides a device that provides one or more current circuits and/or coolant circuits with an inlet and outlet. The connecting piece according to the invention thus functions as a central electric and hydraulic coupling device on an electromagnetic machine that comprises a coil that is wound by hollow electric conductors In a first particular embodiment of the present invention, the first inner space is hydraulically connected to one hollow conductor opening and the second inner space is hydraulically connected to three hollow conductor openings. This configuration is used, for example, with a star circuit for three-phase alternating current. The hollow conductor opening of the first inner space is here a hydraulic star point that is fed with coolant via a coolant inlet. Starting from the star point, one or more hollow electric conductors are guided into three arms of the star circuit. A phase that comprises one or more hollow electric conductors is hydraulically guided back by each of the arms to one of the three hollow conductor openings of the second inner space that is connected to a coolant outlet. All hollow conductor openings are electrically insulated from one another.

In a second, alternative particular embodiment of the present invention to the first particular embodiment, the first inner space is hydraulically connected to two hollow conductor openings and the second inner space is hydraulically connected to two hollow conductor openings. This configuration is used, for example, in a triangle circuit for three-phase alternating current. The two hollow conductor openings of the first inner space are connected to a coolant inlet, wherein a hollow conductor opening is connected to one or a plurality of hollow electric conductors and the other hollow conductor opening is connected to one or a plurality of hollow electric conductors. The hollow electric conductors are guided into the three legs of the triangle circuit. A phase that comprises one or more hollow electric conductors is guided back by each of the legs to the two waveguide hollow conductor openings of the second inner space that is connected to a coolant outlet, wherein a hollow conductor opening is connected to a plurality of hollow electric conductors and the other hollow conductor opening is connected to one or a plurality of hollow electric conductors. The respective other hollow conductor openings are electrically connected to one another. Otherwise, the hollow conductor openings are electrically insulated from one another.

In a very advantageous embodiment of the present invention, the coolant line-side housing part and the hollow conductor-side housing part are connected to each other by means of plate-spring bearing screws. Screws, in particular steel screws, allow a continuous and sufficiently strong pressing of the two housing parts onto each other in order to achieve a tight connection between the two housing parts. A torque for the screws is about 6 Nm. The plate springs balance temperature-induced variations in a geometric extension of the housing parts.

In a preferred embodiment of the present invention, the coolant line-side housing part consists of copper and the hollow conductor-side housing part consists of plastic reinforced with glass fibre. The copper is soft copper, in particular, having a Vickers hardness of less than 50 and a tensile strength of about 200 N/mm$^2$. Furthermore, the ratio of the heat expansion coefficient of copper to the heat expansion coefficient of numerous ceramic materials of 2:1 has proved optimal in order to achieve a tight connection between the coolant line-side housing part and the balls across a wide temperature range. The plastic reinforced with glass fibre gives the hollow conductor-side housing part sufficient mechanical stability and electric insulating properties, such that a short-circuit or voltage surge between the individual hollow conductor openings in prevented.

The connecting piece according to the invention is used in electromagnetic machines that comprise at least one coil that is wound by at least one hollow electric conductor. Preferred electromagnetic machines are electric motors, generators, transformers, inductors, frequency converters and batteries. As a result of a suitable arrangement, complete electric systems can thus be equipped with hollow conductor cooling, for example by frequency converters, batteries and similar being coupled.

The invention is described in two preferred embodiments with reference to the drawings by way of example, wherein further advantageous details can be seen in the figures of the drawings.

Figure 2:
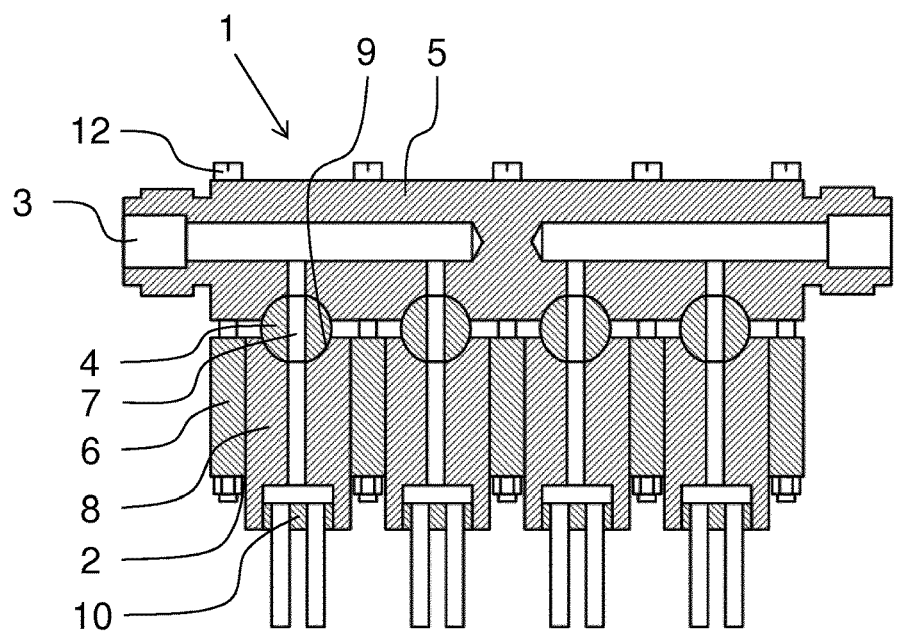
Figure 3:
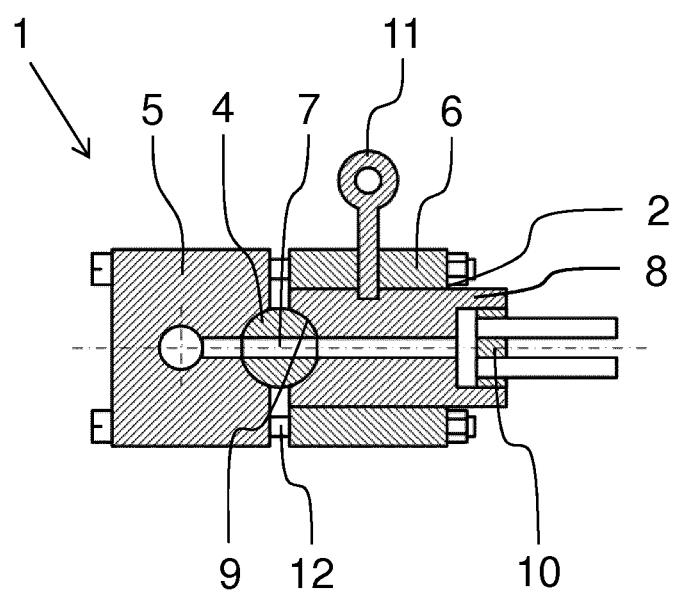

The figures of the drawings show in detail:

FIG. 1, a sectional view of a connecting piece according to a first embodiment of the present invention;

FIG. 2, a sectional view of a connecting piece according to a second embodiment of the present invention; and FIG. 3, a further sectional view of the connecting piece according to the first or the second embodiment of the present invention.

FIG. 1 shows a sectional view of a connecting piece according to a first embodiment of the present invention. The first embodiment is used with a star circuit. The connecting piece according to the first embodiment serves for connecting eight hollow electric conductors and two coolant lines, namely a coolant inlet and a coolant outlet. The connecting piece comprises: a fluid-tight housing 1 having two hollow inner spaces; four hollow conductor openings 2 in the housing 1 for receiving the hollow electric conductors; two coolant line openings 3 in the housing 1 for receiving the coolant lines; and four electrically insulating separating elements 4. The housing 1 comprises a coolant line-side housing part 5 and a hollow conductor-side housing part 6 that can be separated from the coolant line-side housing part 5. The coolant line-side housing part 5 consists of copper. The hollow conductor-side housing part 6 consists of plastic reinforced with glass fibre.

Each of the separating elements 4 is arranged between the coolant line-side housing part 5 and the hollow conductor-side housing part 6, spaces the coolant line-side housing part 5 and the hollow conductor-side housing part 6 apart from each other and has a coolant channel 7, wherein the coolant channel 7 provides a part of the inner space. It is essential according to the invention that each of the separating elements 4 be formed as a ball. The balls consist of a ceramic material, namely zirconium dioxide. Furthermore, the connecting piece comprises four electrically conducting coupling pieces 8 arranged in the hollow conductor opening 2 for fixing the hollow electric conductor to the hollow conductor-side housing part 6. Each of the coupling pieces 8 has a spherical segment shaped recess 9 on a ball-side end of the respective coupling piece 8, in which recess 9 the ball is received. Alternatively, the recess 9 is formed spherically. In addition, each of the coupling pieces 8 comprises a collecting disc 10 on a hollow conductor-side end of the respective coupling piece 8. The collecting disc 10 of the one coupling piece 8 that is part of an inlet inner space (the left inner space in FIG. 1) has two or, where necessary, more bores for receiving hollow electric conductors. Each of the collecting discs 10 of the three coupling pieces 8 that are part of the outlet inner space (the right inner space in FIG. 1) has two or, where necessary, more bores for receiving hollow electric conductors. The hollow conductors are thus brazed to the collecting discs. The collecting discs are brazed to the respective coupling pieces 8. The coupling piece 8 of the inlet inner space is hydraulically separated and electrically insulated from the three coupling pieces 8 of the outlet inner space inside the housing 1. The three coupling pieces 8 of the outlet inner space are hydraulically connected to one another inside the housing 1 and are electrically insulated from one another. The coolant line-side housing part 5 and the hollow conductor-side housing part 6 are connected to each other by means of ten plate-spring bearing screws 12.

FIG. 2 shows a sectional view of a connecting piece according to a second embodiment of the present invention. The second embodiment is used with a triangular circuit. The connecting piece according to the second embodiment is constructed very similarly to the connecting piece according to the first embodiment. However, the four coupling pieces 8 are interconnected hydraulically and electrically differently. Each of the collecting discs 10 of the two outer coupling pieces 8 has two or, where necessary, more bores for receiving hollow electric conductors. Each of the collecting discs 10 of the two inner coupling pieces 8 has two or, where necessary, more bores for receiving hollow electric conductors. The two inner coupling pieces 8 are electrically connected to each other. Otherwise, the coupling pieces 8 are electrically insulated from each other. The inlet inner space is hydraulically connected to two hollow conductor openings 2. The outlet inner space is hydraulically connected to two hollow conductor openings 2. The two coupling pieces 8 of the inlet inner space depicted on the left (the left inner space in FIG. 2) are hydraulically connected to each other inside the housing 1 and are electrically insulated from each other. The two coupling pieces 8 of the outlet inner space depicted on the right (the right inner space in FIG. 2) are hydraulically connected to each other inside the housing 1 and are electrically insulated from each other. The two inner coupling pieces 8 belong to different inner spaces yet are electrically connected to each other.

FIG. 3 shows a further sectional view of the connecting piece according to the first or the second embodiment of the present invention. The sectional plane is orthogonally oriented relative to the sectional planes according to FIGS. 1 and 2 and makes the coupling piece 8 of the inlet inner space visible. The diameter of the recess 9 of the coupling piece 8 of the inlet inner space is 15 mm. The separating element 4 formed as a ball of the inlet inner space has a diameter of 15 mm. The coupling piece 8 comprises a contact plate 11, wherein the contact plate 11 is formed passing through the hollow conductor-side housing part 6. The contact plate 11 has a bore in order to enable a stable connection to an electric cable or cable lug, for example.

LIST OF REFERENCE NUMERALS

1 Housing
2 Hollow conductor opening
3 Coolant line opening
4 Separating element
5 Coolant line-side housing part
6 Hollow conductor-side housing part
7 Coolant channel
8 Coupling piece
9 Recess
10 Collecting disc
11 Contact plate
12 Screw

The invention claimed is:

1. A connecting piece for connecting an electric hollow conductor and a coolant line, comprising:
   a fluid-tight housing (1) having a hollow inner space;
   a hollow conductor opening (2) in the housing (1) for receiving the electric hollow conductor;
   a coolant line opening (3) in the housing (1) for receiving the coolant line; and
   an electrically insulating separating element (4), wherein:
   the hollow inner space is formed hydraulically connecting the hollow conductor opening (2) and the coolant line opening (3);
   the housing (1) comprises a coolant line-side housing part (5) and a hollow conductor-side housing part (6) that is separable from the coolant line-side housing part (5); and
   the separating element (4) is arranged between the coolant line-side housing part (5) and the hollow conductor-side housing part (6), and is formed spacing the coolant line-side housing part (5) and the hollow conductor-side housing part (6) apart from each other, so as to electrically insulate both housing parts from each other,
   wherein the connecting piece comprises an electrically conductive coupling piece (8) arranged in the hollow conductor opening (2) for fixing the electric hollow conductor on the hollow conductor-side housing part (6), wherein the coupling piece (8) has a spherical segment shaped or spherical recess (9) on a ball-side end of the coupling piece (8) and an internal coolant channel which exits the coupling piece (8) at the position of the recess (9), and
   wherein the separating element (4) is formed as a ball that has a coolant channel (7) which communicates with the internal cooling channel of the coupling piece (8), wherein the coupling piece (8) comprises a collecting disc (10) on a hollow conductor-side end of the coupling piece (8), wherein the collecting disc (10) has two or more bores for receiving electric hollow conductors.

2. The connecting piece according to claim 1, wherein the separating element (4) consists of a ceramic material.

3. The connecting piece according to claim 1, wherein the coupling piece (8) comprises a contact plate (11), wherein the contact plate (11) is formed passing through the hollow conductor-side housing part (6).

4. The connecting piece according to claim 1, wherein the housing (1) has two or more inner spaces, wherein a first inner space of the inner spaces and a second inner space of the inner spaces that is different from the first inner space are hydraulically separated from each other inside the housing (1).

5. The connecting piece according to claim 4, wherein the first inner space is hydraulically connected to one hollow conductor opening (2), and the second inner space is hydraulically connected to three hollow conductor openings (2).

6. The connecting piece according to claim 4, wherein the first inner space is hydraulically connected to two hollow conductor openings (2), and the second inner space is hydraulically connected to two hollow conductor openings (2).

7. The connecting piece according to claim 1, wherein the coolant line-side housing part (5) and the hollow conductor-side housing part (6) are connected to each other by means of plate-spring bearing screws (12).

8. The connecting piece according to claim 1, wherein the coolant line-side housing part (5) consists of copper.

9. The connecting piece according to claim 1 wherein the waveguide-side housing part (6) consists of plastic reinforced with glass fibre.

10. A connecting piece for connecting an electric hollow conductor and a coolant line, comprising:
   a fluid-tight housing (1) having a hollow inner space;
   a hollow conductor opening (2) in the housing (1) for receiving the electric hollow conductor;
   a coolant line opening (3) in the housing (1) for receiving the coolant line; and
   an electrically insulating separating element (4), wherein:
      the hollow inner space is formed hydraulically connecting the hollow conductor opening (2) and the coolant line opening (3);
      the housing (1) comprises a coolant line-side housing part (5) and a hollow conductor-side housing part (6) that is separable from the coolant line-side housing part (5); and
      the separating element (4) is arranged between the coolant line-side housing part (5) and the hollow conductor-side housing part (6), and is formed spacing the coolant line-side housing part (5) and the hollow conductor-side housing part (6) apart from each other, so as to electrically insulate both housing parts from each other,
   wherein the connecting piece comprises an electrically conductive coupling piece (8) arranged in the hollow conductor opening (2) for fixing the electric hollow conductor on the hollow conductor-side housing part (6), wherein the coupling piece (8) has a spherical segment shaped or spherical recess (9) on a ball-side end of the coupling piece (8) and an internal coolant channel which exits the coupling piece (8) at the position of the recess (9),
   wherein the separating element (4) is formed as a ball that has a coolant channel (7) which communicates with the internal cooling channel of the coupling piece (8), and
   wherein the coupling piece (8) comprises a contact plate (11), wherein the contact plate (11) is formed passing through the hollow conductor-side housing part (6).

11. A connecting piece for connecting an electric hollow conductor and a coolant line, comprising:
   a fluid-tight housing (1) having a hollow inner space;
   a hollow conductor opening (2) in the housing (1) for receiving the electric hollow conductor;
   a coolant line opening (3) in the housing (1) for receiving the coolant line; and
   an electrically insulating separating element (4), wherein:
      the hollow inner space is formed hydraulically connecting the hollow conductor opening (2) and the coolant line opening (3);
      the housing (1) comprises a coolant line-side housing part (5) and a hollow conductor-side housing part (6) that is separable from the coolant line-side housing part (5); and
      the separating element (4) is arranged between the coolant line-side housing part (5) and the hollow conductor-side housing part (6), and is formed spacing the coolant line-side housing part (5) and the hollow conductor-side housing part (6) apart from each other, so as to electrically insulate both housing parts from each other,
   wherein the connecting piece comprises an electrically conductive coupling piece (8) arranged in the hollow conductor opening (2) for fixing the electric hollow conductor on the hollow conductor-side housing part (6), wherein the coupling piece (8) has a spherical segment shaped or spherical recess (9) on a ball-side end of the coupling piece (8) and an internal coolant channel which exits the coupling piece (8) at the position of the recess (9),
   wherein the separating element (4) is formed as a ball that has a coolant channel (7) which communicates with the internal cooling channel of the coupling piece (8), and
   wherein the housing (1) has two or more inner spaces, wherein a first inner space of the inner spaces and a second inner space of the inner spaces that is different from the first inner space are hydraulically separated from each other inside the housing (1).

12. A connecting piece for connecting an electric hollow conductor and a coolant line, comprising:
   a fluid-tight housing (1) having a hollow inner space;
   a hollow conductor opening (2) in the housing (1) for receiving the electric hollow conductor;
   a coolant line opening (3) in the housing (1) for receiving the coolant line; and
   an electrically insulating separating element (4), wherein:
      the hollow inner space is formed hydraulically connecting the hollow conductor opening (2) and the coolant line opening (3);
      the housing (1) comprises a coolant line-side housing part (5) and a hollow conductor-side housing part (6) that is separable from the coolant line-side housing part (5); and
      the separating element (4) is arranged between the coolant line-side housing part (5) and the hollow conductor-side housing part (6), and is formed spacing the coolant line-side housing part (5) and the hollow conductor-side housing part (6) apart from each other, so as to electrically insulate both housing parts from each other,
   wherein the connecting piece comprises an electrically conductive coupling piece (8) arranged in the hollow conductor opening (2) for fixing the electric hollow conductor on the hollow conductor-side housing part (6), wherein the coupling piece (8) has a spherical segment shaped or spherical recess (9) on a ball-side end of the coupling piece (8) and an internal coolant channel which exits the coupling piece (8) at the position of the recess (9),
   wherein the separating element (4) is formed as a ball that has a coolant channel (7) which communicates with the internal cooling channel of the coupling piece (8), and wherein the coolant line-side housing part (5) and the hollow conductor-side housing part (6) are connected to each other by means of plate-spring bearing screws (12).

\* \* \* \* \*